US012474377B2

United States Patent
Weikle, II et al.

(10) Patent No.: US 12,474,377 B2
(45) Date of Patent: Nov. 18, 2025

(54) SYSTEM AND METHOD FOR INTEGRATING DIODE SENSORS ON MICROMACHINED WAFER PROBES

(71) Applicant: University of Virginia Patent Foundation, Charlottesville, VA (US)

(72) Inventors: Robert M. Weikle, II, Crozet, VA (US); Linli Xie, Charlottesville, VA (US); Michael E. Cyberey, Charlottesville, VA (US); Souheil Nadri, Charlottesville, VA (US); Matthew F. Bauwens, Chesapeake, VA (US); Arthur Weston Lichtenberger, Charlottesville, VA (US); Nicolas Scott Barker, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 0 days.

(21) Appl. No.: 17/053,930

(22) PCT Filed: May 10, 2019

(86) PCT No.: PCT/US2019/031758
§ 371 (c)(1),
(2) Date: Nov. 9, 2020

(87) PCT Pub. No.: WO2019/217842
PCT Pub. Date: Nov. 14, 2019

(65) Prior Publication Data
US 2021/0223288 A1 Jul. 22, 2021

Related U.S. Application Data

(60) Provisional application No. 62/669,545, filed on May 10, 2018.

(51) Int. Cl.
*G01K 7/01* (2006.01)
*G01R 1/067* (2006.01)
(Continued)

(52) U.S. Cl.
CPC ............... *G01R 3/00* (2013.01); *G01K 7/015* (2013.01); *G01R 1/06772* (2013.01); *G01R 19/0046* (2013.01)

(58) Field of Classification Search
CPC .. G01R 3/00; G01R 1/06772; G01R 19/0046; G01K 7/015
See application file for complete search history.

(56) References Cited

U.S. PATENT DOCUMENTS 4,983,910 A * 1/1991 Majidi-Ahy ....... G01R 1/06772
333/32
8,164,154 B1 * 4/2012 Tanielian .......... H01L 31/02021
257/454

(Continued)

FOREIGN PATENT DOCUMENTS

CA 2256663 A1 * 6/1999 ......... G01N 27/4166
CN 102167281 A * 8/2011

OTHER PUBLICATIONS

"Silicon-on-Insulator Substrates as a Micromachining Platform for Advanced Terahertz Circuits" Barker et al. (Year: 2017).*
(Continued)

*Primary Examiner* — Paresh Patel
(74) *Attorney, Agent, or Firm* — Jenkins, Taylor & Hunt, P.A.

(57) ABSTRACT

A probe chip device and a method for fabricating a probe chip device with an integrated diode sensor are disclosed. In one example, a probe chip device includes a beam head element that includes at least one probe tip that is configured to electrically probe a device under test. The probe chip
(Continued)

device further includes a diode sensor that is heterogeneously integrated on the beam head element and is proximally positioned to the at least one probe tip.

6 Claims, 9 Drawing Sheets

(51) Int. Cl.
*G01R 3/00* (2006.01)
*G01R 19/00* (2006.01)

(56) References Cited

U.S. PATENT DOCUMENTS

| | | | |
|---|---|---|---|
| 8,309,930 B2* | 11/2012 | Gelmont | G01N 21/4788 |
| | | | 250/341.1 |
| 8,587,037 B1* | 11/2013 | Li | G01K 7/22 |
| | | | 257/256 |
| 9,366,697 B2 | 6/2016 | Weikle, II et al. | |
| 2002/0050834 A1 | 5/2002 | Olsen et al. | |
| 2008/0173882 A1* | 7/2008 | Parikh | H01L 29/872 |
| | | | 257/E33.001 |
| 2008/0191304 A1* | 8/2008 | Zhang | H01L 29/1608 |
| | | | 257/E27.068 |
| 2010/0096640 A1 | 4/2010 | Kim et al. | |
| 2012/0068725 A1* | 3/2012 | Pagani | G01R 31/2884 |
| | | | 324/750.16 |
| 2013/0106456 A1 | 5/2013 | Weikle, II et al. | |
| 2017/0250083 A1* | 8/2017 | Alijabbari | H01L 29/66212 |
| 2022/0050834 A1 | 2/2022 | Rolle et al. | |

OTHER PUBLICATIONS

"Silicon-on-Insulator Substrates as a Micromachining Platform for Advanced Terahertz Circuits" by Barker et al. (Year: 2017).*
Translation of CN 102167281 A (Year: 2011).*
International Search Report and Written Opinion corresponding to International Application No. PCT/US2019/031758 dated Aug. 2, 2019.
Alijabbari et al., "160 GHZ Balanced Frequency Quadruplers Based on Quasi-Vertical Schottky Varactors Integrated on Micromachined Silicon," IEEE Transactions on Terahertz Science and Technology, vol. 4, No. 6, pp. 1-8 (Nov. 2014).
Alijabbari et al., "Design and Characterization of Integrated Submillimeter-Wave Quasi-Vertical Schottky Diodes," IEEE Transactions on Terahertz Science and Technology, vol. 5, No. 1, pp. 73-80 (Jan. 2015).
Bass et al., "Ultra-Thin Silicon Chips for Submillimeter-Wave Applications," In Fifteenth International Symposium on Space THz Technology, pp. 1-10 (2004).
Bauwens et al., "A 1.1 THz Micromachined On-Wafer Probe," IEEE, pp. 1-4 (2014).
Bifano et al., "Microelectromechanical Deformable Mirrors," IEEE Journal of Selected Topics in Quantum Electronics, vol. 5, No. 1, pp. 83-89 (Jan./Feb. 1999).
Caddemi et al., "Microwave Characterization and Modeling of packaged HEMTs by a Direct Extraction Procedure Down to 30 K," IEEE Transactions on Instrumentation and Measurement, vol. 55, No. 2, pp. 465-470 (Apr. 2002).
Caddemi et al., "Characterization Techniques for Temperature-Dependent Experimental Analysis of Microwave Transistors," IEEE Transactions on Instrumentation and Measurement, vol. 52, No. 1, pp. 85-91 (Feb. 2003).
Daughton et al., "WR-5.1 band, on-wafer characterization at cryogenic temperature," IEEE 45th European Microwave Conference, pp. 319-322 (Sep. 1-10, 2015).
Daughton et al., "Cryogenic temperature, 2-port, on-wafer characterization at WR-5.1 frequencies," IEEE, pp. 1-4 (2016).
Gammon et al., "Modelling the inhomogeneous SiC Schottky interface," J. Appl. Phys., vol. 114, pp. 1-12 (2013).
Laskar et al., "Development of Accurate On-Wafer, Cryogenic Characterization Techniques," IEEE Transactions on Microwave Theory and Techniques, vol. 44, No. 7, pp. 1-6 (Jul. 1996).
Nadri et al., "Steady-State Thermal Analysis of an Integrated 160 GHz Balanced Quadrupler Based on Quasi-Vertical Schottky Diodes," in IRMMW-THz, pp. 1-2 (2015).
Ogawa et al., "A 110 GHz SIS Receiver for Radio Astronomy," International Journal of Infrared and Millimeter Waves, vol. 11, No. 6, pp. 1-7 (1990).
Ota et al., "A study of forward characteristics of a GaAIAs temperature sensor diode," Meas. Sci. Technol., vol. 11, No. 815, pp. 1-4 (2000).
Padovani et al., "Field and Thermionic-Field Emission in Schottky Barriers," Solid-State Electronics, vol. 9, pp. 695-707 (1966).
Reck et al., "Micromachined On-wafer Probes," IEEE, pp. 1-4 (2010).
Reck et al., "Micromachined Probes for Submillimeter-Wave On-Wafer Measurements—Part I: Mechanical Design and Characterization," IEEE Transactions on Terahertz Science and Technology, vol. 1, No. 2, pp. 349-356 (Nov. 2011).
Reck et al., "Micromachined Probes for Submillimeter-Wave On-Wafer Measurements—Part II: RF Design and Characterization," IEEE Transactions on Terahertz Science and Technology, vol. 1, No. 2, pp. 357-363 (Nov. 2011).
Samoska, "An Overview of Solid-State Integrated Circuit Amplifiers in the Submillimeter-Wave and THz Regime," IEEE Transactions on Terahertz Science and Technology, vol. 1, No. 1, pp. 1-16 (Sep. 2011).
"Sensor Selection Guide," Lake Shore Cryotronics, Inc., pp. 1-17 (2022).
Svechnikov et al., "Spiral Antenna NbN Hot-Electron Bolometer Mixer at Submm Frequencies," IEEE Transactions on Applied Superconductivity, vol. 7, No. 2, pp. 3395-3398 (Jun. 1997).
Weikle et al., "Micromachined Interfaces for Metrology and Packaging Applications in the Submillimeter-Wave Band," Additional Conferences (Device Packaging, HiTEC, HiTEN, & CICMT), vol. 2017, pp. 1-4 (2017).
Xie et al., "An Epitaxy Transfer Process for Heterogeneous Integration of Submillimeter-Wave GaAs Schottky Diodes on Silicon Using SU-8," IEEE Electron Device Letters, vol. 38, No. 1, pp. 1516-1519 (2017).
Yeager et al., "A Review of Cryogenic Thermometry and Common Temperature Sensors," IEEE Sensors Journal, vol. 1, No. 4, pp. 352-360 (Dec. 2001).
Zhang, "The Effect of Cryogenic Environment on Sensitivity of Piezoelectric Pressure Transducers," 12MTC 2009—International Instrumentation and Measurement Technology Conference, pp. 1-4 (May 5-7, 2009).
International Preliminary Report on Patentabiity corresponding to International Application No. PCT/US2019/031758 dated Nov. 19, 2020.

* cited by examiner

SYSTEM AND METHOD FOR INTEGRATING DIODE SENSORS ON MICROMACHINED WAFER PROBES

PRIORITY CLAIM

This application claims the benefit of U.S. Provisional Patent Application Ser. No. 62/669,545, filed May 10, 2018, the disclosure of which is incorporated herein by reference in its entirety.

GOVERNMENT INTEREST

This invention was made with government support under Grant Number W911W5-16-C-0007 awarded by the National Ground Intelligence Center and Grant Number 1609411 awarded by the National Science Foundation. The government has certain rights in the invention.

TECHNICAL FIELD

The subject matter described herein relates to improved methods and systems for utilizing and fabricating on-wafer probes that utilize integrated sensor devices. More particularly, the subject matter described herein relates to systems and methods for integrating diode sensors on micromachined wafer probes.

BACKGROUND

Presently, instrumentation systems used to characterize integrated circuit devices and components operating at extremely high frequencies are typically modular in nature. For example, a system configured to measure extremely high frequencies can comprise a separate probing device that is connected to a number of separate sensor units, which are similarly connected to a backend network analyzer or vector network analyzer (VNA). Notably, these systems are configured to utilize a number of separate devices and instruments that tend to be cumbersome or even prevent the ability to conduct certain types of measurements. For example, acquiring measurement data directly from a device or object of interest that is situated in a hermetically sealed testing chamber or some other enclosed testing apparatus (e.g., a cryostat) can be extremely problematic, if not impossible. Specifically, the form factor of these instrumentation systems can often prevent a test operator from obtaining measurement data in instances when the DUT is positioned in a constricted testing environment.

SUMMARY

A probe chip device and a method for fabricating a probe chip device with an integrated diode sensor are disclosed. In some embodiments, a probe chip device includes a beam head element that includes at least one probe tip that is configured to electrically probe a device under test. The probe chip device further includes a diode sensor that is heterogeneously integrated on the beam head element and is proximally positioned to the at least one probe tip.

In one example of the probe chip device, the diode sensor is a temperature sensing element.

In one example of the probe chip device, the diode sensor is a radio frequency measuring element.

In one example of the probe chip device, the diode sensor is integrated onto the beam head element using a bonding agent.

In one example of the probe chip device, the diode sensor is a Schottky diode sensor.

In one example of the probe chip device, the diode sensor is electrically connected to a plurality of point sensing contact pads positioned on the probe chip device via a respective plurality of signal wires.

In one example of the probe chip device, the plurality of signal wires is utilized to supply the diode sensor with a sensing voltage or a sensing current by a measurement instrument.

In one example of the probe chip device, the sensing voltage or the sensing current is applied to the at least one probe tip via the diode sensor.

In one example of the probe chip device, the at least one probe tip is configured to establish contact with an integrated circuit device under test.

In one example of the probe chip device, the diode sensor is configured to conduct at least one of a reflectometry functionality, a mixer functionality, a multiplying functionality, or tuning functionality.

In some embodiments, the subject matter described herein also includes a method for fabricating a probe chip device with an integrated diode sensor that comprises constructing a probe chip device by using a silicon-on insulator wafer that is electroplated and subsequently etched to form at least a beam head element including a probe tip. The method further includes constructing a diode sensor by providing a semi-insulating wafer comprising a plurality of epitaxial layers and facilitating a formation of a contact pedestal and thermal heat sink on or more of the plurality of epitaxial layers. The method also includes bonding one or more of the epitaxial layers of the diode sensor to a silicon surface of the beam head element utilizing a bonding agent to heterogeneously integrate the diode sensor to the probe chip device.

In one example of the method, constructing the diode sensor includes using a photolithographic patterning technique and a sequence of selective etches to formulate at least one diode mesa on one of the epitaxial layers.

In one example of the method, constructing the diode sensor includes using a photolithographic patterning technique to form an anode contact of the diode sensor, an airbridge finger, and the contact pedestal.

In one example of the method, the contact pedestal is bonded to the silicon surface and underlies the diode mesa and the anode contact.

In one example of the method, the diode mesa is defined on top of the contact pedestal using piranha etching solution.

In one example of the method, the bonding agent includes a negative photoresist solution has a low curing temperature and a low percent volume shrinkage after crosslinking.

In one example of the method, the negative photoresist solution is an SU-8 photoresist solution.

In one example of the method, the probe chip device is constructed with a plurality of point sensing contact pads positioned at a terminal end of the probe chip device.

In one example of the method, the diode sensor is connected to the plurality of point sensing contact pads via a respective plurality of signal lines.

In one example of the method, the probe tip is electrically connected to the diode sensor.

An object of the presently disclosed subject matter having been stated hereinabove, and which is achieved in whole or in part by the presently disclosed subject matter, other objects will become evident as the description proceeds hereinbelow.

BRIEF DESCRIPTION OF THE DRAWINGS

Embodiments of the subject matter described herein will now be explained with reference to the accompanying drawings, wherein like reference numerals represent like parts, of which.

DETAILED DESCRIPTION

Figure 1:
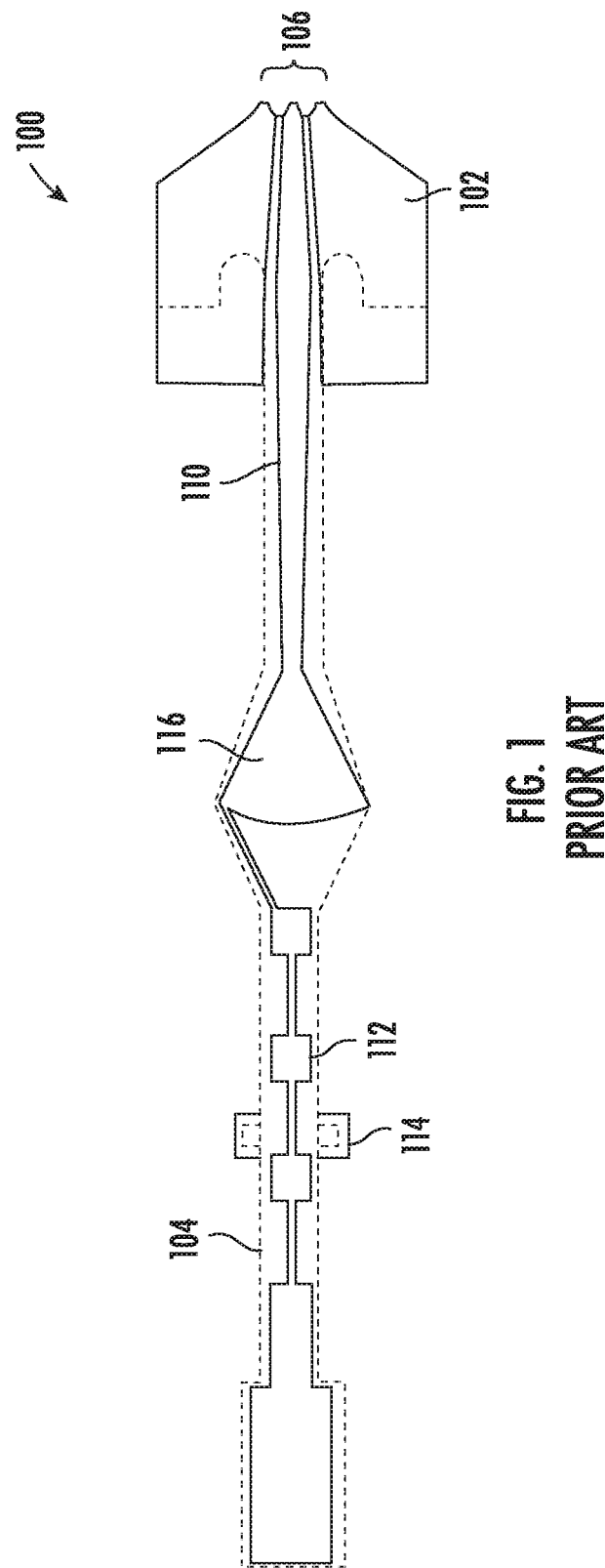
FIG. 1 is a schematic diagram illustrating the geometry and layout of an exemplary probe chip device.

The subject matter described herein relates to methods and systems for integrating diode sensors on micromachined wafer probe chips. In some embodiments, the disclosed subject matter pertains to the design and fabrication process for implementing an on-wafer probe chip device that includes an integrated diode sensor. For example, the integrated diode sensor can include, but is not limited to, a temperature diode sensor, a radio frequency (RF) measurement diode sensor (e.g., an RF detector as used in a reflectometer), and the like. Notably, the integrated diode sensor comprises a wafer probe fabricated from high-resistivity silicon using micromachining techniques. Although the following description discloses the fabrication and use of an integrated temperature sensing diode element, any diode sensor capable of performing on wafer measurements, assessments, or other functionalities (e.g., mixing and/or multiplying functionalities, tuning functionalities, and the like) can be utilized without departing from the scope of the disclosed subject matter. In some embodiments, the aforementioned diode sensor element is a Gallium Arsenide (GaAs) Schottky diode that is integrated with the wafer probe chip through an epitaxy transfer process that utilizes a bonding agent (e.g., a metal or a photoresist solution, such as SU-8). An example design of the wafer probe chip as well as the fabrication techniques of the integrated diode element for an exemplary temperature sensor are described below.

1. INTRODUCTION

On-wafer characterization of cryogenically-cooled millimeter-wave devices, which are critical components that are used for a variety of heterodyne instruments, can present a significant challenge to test engineers. In order to collect relevant radio frequency (RF) performance data, the sample substrate stage to which the millimeter-wave devices are affixed must typically reach temperatures below 20 Kelvin (K) for low-noise amplifiers. Likewise, temperatures below 5 K must be reached for tests utilizing niobium-based superconducting components (e.g., hot electron bolometer (HEB) detectors, semiconductor-insulator-semiconductor (SIS) mixers, etc.). Consequently, systems configured for conducting on-wafer metrology of these types of cryogenic millimeter-wave devices must cautiously balance the requirement of low RF path loss with respect to the minimum heat load on the device under test (DUT).

The RF cryogenic on-wafer characterization of DUTs has been previously conducted. For example, the use of on-wafer probe devices to measure millimeter-wave cryogenic devices in the WR-5.1 band (e.g., 140-220 GHz) has been analyzed. Notably, an on-wafer probe device fabricated from micromachined silicon can be incorporated into a cryogenic wafer probe station (e.g., Lakeshore model TTP-6). In some instances, copper braids, which were anchored to the radiation shield of a probe station, are used to thermally ground the probe station housing. Likewise, separate diode sensor devices that are mechanically mounted to the probe body can be configured to monitor the temperature and stability of the assembly. This arrangement permitted on-wafer measurements at temperatures up to 9 K, but was limited by the thermal load associated with the probe making contact with the DUT.

Practical implementation of the aforementioned probe station systems requires the positioning of the temperature sensors at a sufficient distance away from the DUT. Improper thermal grounding of the probe as well as power dissipation in the device can result in elevated temperatures near the DUT. Notably, the elevated temperatures can generate thermal gradients and associated errors in the sensors' temperature measurement.

To address this issue, the disclosed subject matter describes a diode-based sensor (e.g., a diode-based temperature sensor embodiment) that is integrated onto a micromachined probe tip that allows for the immediate and proximate monitoring of a DUT (e.g., temperature levels near a DUT). In some embodiments, the integrated diode sensor is implemented using an epitaxy transfer process in which III-V semiconductor material (e.g., GaAs) is heterogeneously integrated onto high-resistivity silicon. Subsequent processing and micromachining of the silicon is used to form the diode sensor and the fully-integrated RF on-wafer probe chip.

As indicated above, the following description discloses the fabrication and use of an exemplary integrated temperature sensing diode element. However, any diode sensor capable of performing on wafer measurements, assessments, or other functionalities (e.g., signal mixing and/or multiplying functionalities, tuning functionalities, and the like) can be integrated on a probe chip in a similar manner without departing from the scope of the disclosed subject matter.

II. MICROMACHINED WAFER PROBES

In some embodiments, the wafer probe device presented herein is based on the micromachining of silicon-on-insulator (SOI) substrates to form fully-integrated probe chips. This technology can form thin support substrates for terahertz circuits, such as on-wafer probe chip devices operating above 1 terahertz (THz).

FIG. 1 illustrates the geometry and layout of a wafer probe chip device, herein referred to as probe chip 100. Notably, probe chip 100 as illustrated in FIG. 1 depicts the base platform for the disclosed subject matter and does not presently include a diode sensor, whose integration will be described in greater detail below. In some embodiments, probe chip 100 comprises a single, integrated module that is fabricated on thin (e.g., 15 µm) micromachined high-resistivity semiconductor material 104, such as silicon. In some embodiments, the semiconductor material 104 can be characterized as having a resistivity of greater than 10 kiloohm centimeters (kΩ·cm). Probe chip 100 may further include incorporated probe tips 106 that are positioned at the terminal end of a beam head element 102 and are configured for direct interfacing (e.g., establishing contact) with a DUT. Probe tips 106 may comprise any metallized or metallic material that is conducive for forming an electrical contact for probe chip 100. Probe chip 100 also include an integrated waveguide transition element 116 and a transmission-line transition section 110 that facilitate the transmission of electromagnetic waves generated by a measurement instrument (see details below) to probe tips 106. In some embodiments, probe chip 100 is further configured with an integrated low pass filter 112 for applying bias and beamlead tabs 114 that can be used to align and mount probe chip 100 to a probe assembly housing.

In some embodiments, probe chip 100 is configured for probing a DUT structure (e.g., an integrated circuit) on a surface of an object substrate (not shown). Probe chip 100 can be a microfabricated compliant chip that includes integrated electrical interconnects. In some embodiments, probe chip 100 is monolithic due to its single-piece circuit construction. The DUT structure on the object substrate can be one or more of: an integrated circuit or any type of microelectronic device, microelectromechanical (MEM) device, non-electronic device, or a sample of material with appropriate contacts or some other geometric feature that has been fabricated on the substrate surface. Further, the DUT structure on the object substrate may be, for example, any device or material that may be at, for example, the micron-scale or nano-scale. In some embodiments, the integrated electrical interconnects of probe chip 100 may generally include one or more of the aforementioned beam head element 102, transmission line 110, waveguide transition element 116, whereby the transmission line 110 is suitable to electrically interconnect beam head element 102 with waveguide transition element 116. As indicated above, waveguide transition element 116 is configured to be electrically interconnected with a measurement instrument, by way of a waveguide channel that is formed in a probe assembly housing, for example. The measurement instrument (not shown) may be a network analyzer or vector network analyzer (VNA), or any system or device capable of measuring, analyzing, storing, processing and/or recording data captured by probe chip 100. Further, the integrated electrical interconnects may be further configured to supply a bias current (and/or bias voltage) to the object substrate. Moreover, other active and passive circuit components may be added to the integrated electrical interconnects as desired or required.

A. Probe Fabrication Process

In some embodiments, the fabrication method used to construct probe chip 100 comprises both a frontside process and a backside process that are applied to a SOI substrate. Initially, circuit features, electrical contact pads, and beam-lead areas are formed through the sputtering and electroplating of several microns of gold and/or nickel plated metals through a lithographically-defined plating mask. Afterwards, the SOI wafer is subsequently bonded (e.g., "device side" down) to a temporary carrier wafer. The thick backside silicon "handle" layer is then removed using a combination of mechanical lapping and high selectivity chemical plasma etching techniques. Moreover, the buried oxide layer acts as an efficient etch stop for the silicon handle removal and can be subsequently removed using a buffered oxide etchant (BOE) wet etch solution. Notably, the application of the BOE wet etch solution can reveal the backside area of the high-resistivity silicon "device side" layer. In addition, backside alignment to vias can be used and gold is plated on the backside of the probe chip device. Afterwards, a "silicon extents" etch is performed by using a reactive ion etching (e.g., a reactive ion plasma) to define the final shape and size of the probe chip. This process permits probe chips of an arbitrary geometry to be realized, thereby allowing them to be precisely tailored to accommodate a specific probe assembly housing configuration. In a final step of the fabrication process, the temporary carrier wafer is removed and the individual probe chip devices can be released and/or diced.

Figure 2:
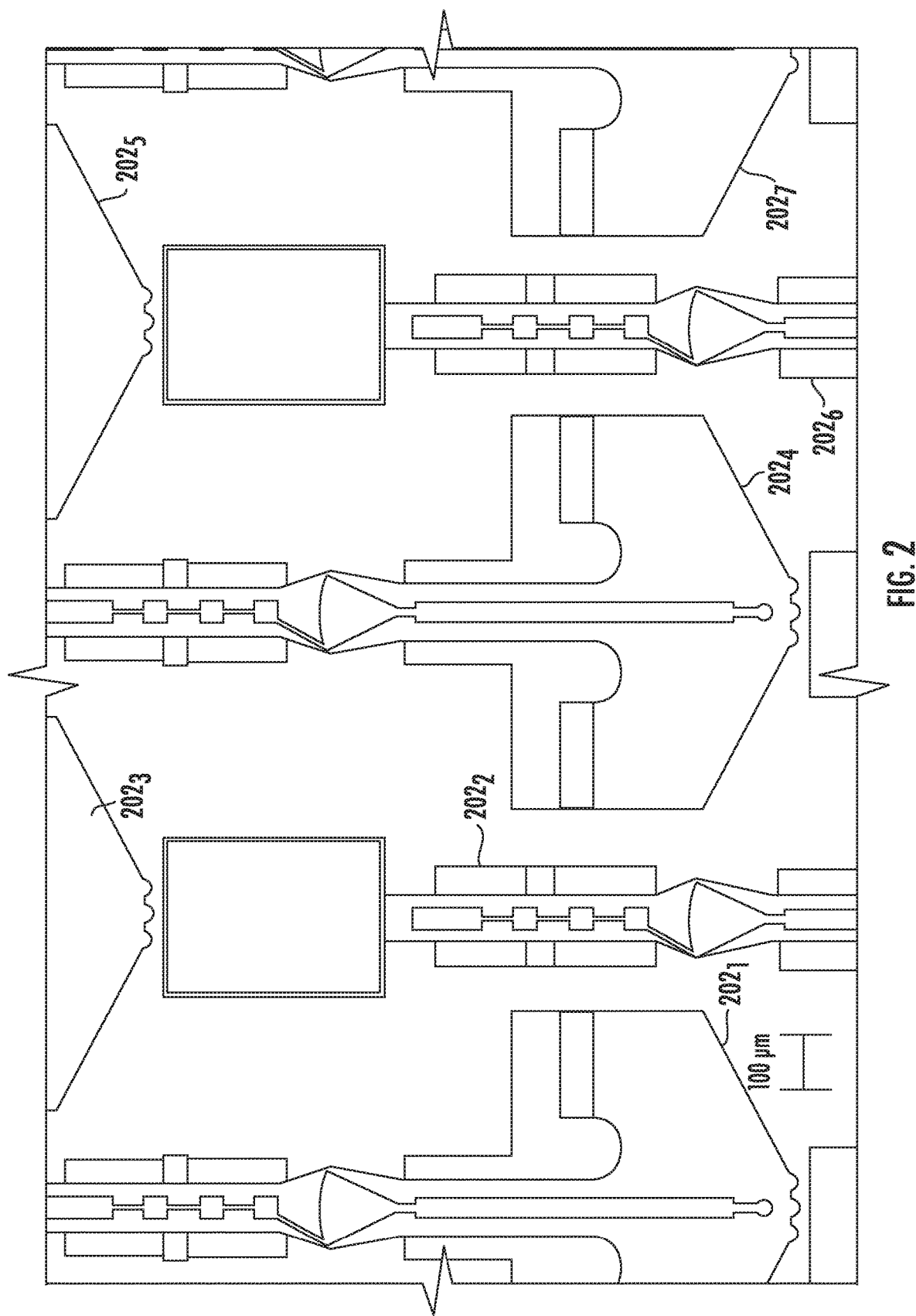
FIG. 2 is a schematic diagram illustrating an exemplary array of completed micromachined on-wafer probe chips according to an embodiment of the subject matter described herein.

FIG. 2 is a schematic diagram illustrating an exemplary array of completed micromachined on-wafer probe chips according to an embodiment of the subject matter described herein. In particular, FIG. 2 illustrates a portion of an array of completed probe chips 202$_1$-7 prior to release and/or dicing. After being released from a temporary carrier wafer, probe chips 202$_1$-7 exhibit no deformations or curling associated with residual stress in the silicon support membrane. For example, terahertz detector circuits supported by free-standing silicon membranes as thin as 3 microns can be realized with no issues associated with internal stresses. Because each of the micromachined probe chips 202$_1$-7 is an integrated unit, the assembly of a probe chip device is straightforward. Namely, one probe chip 202 comprises a drop-in module that self-aligns to, and sits within, recesses that are milled into a probe assembly housing configured to accommodate the probe chip as shown in FIG. 3.

Figure 3:
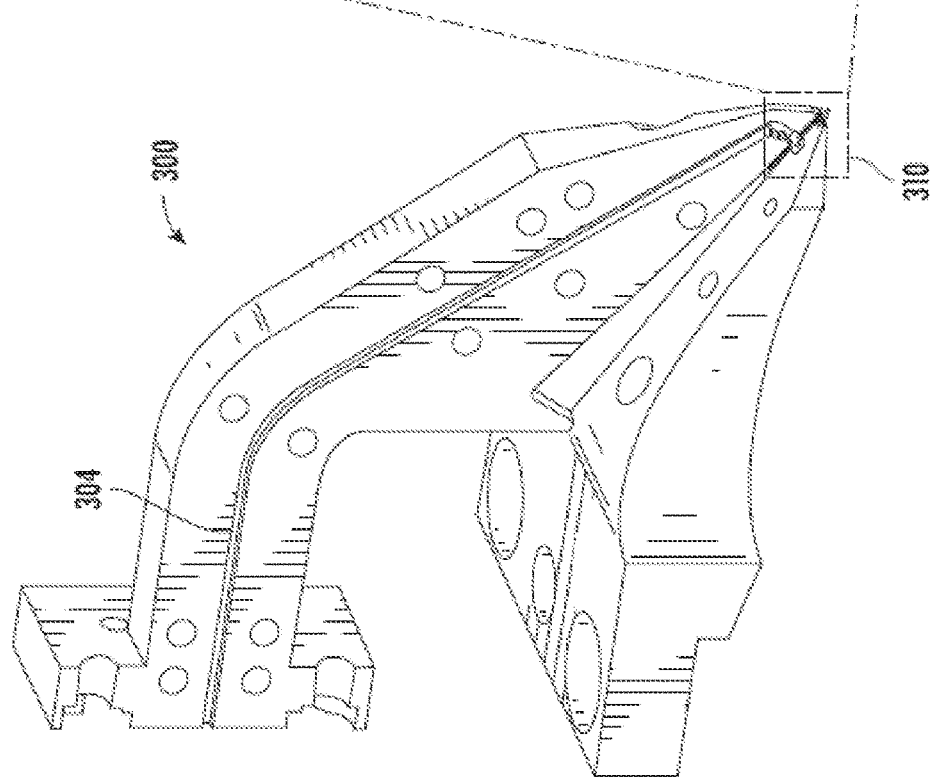
FIG. 3 is a schematic diagram illustrating an exemplary micromachined probe assembly housing according to an embodiment of the subject matter described herein.

FIG. 3 is a schematic diagram illustrating an exemplary micromachined probe assembly housing according to an embodiment of the subject matter described herein. In particular, FIG. 3 depicts an illustration of a micromachined probe assembly housing 300 that includes an RF waveguide channel 304 that is configured to guide electromagnetic waves to an inserted probe chip 302. Notably, no adhesives are required for assembly of the probe device since probe chip 302 is held in position through protruding tabs (e.g., tabs 114 shown in FIG. 1) that are clamped between the sections of the probe assembly housing 300. Further, detailed view 310 depicts probe chip 302 positioned within and/or lying in a recess (e.g., formed by a terminal end of waveguide channel 304) that has been milled into probe assembly housing 300. This recess feature allows probe chip 302 to be easily and promptly removed in the event the probe chip is damaged or requires replacement. The recess feature also provides sufficient space for waveguide transition 316 to be exposed to electromagnetic waves traversing waveguide channel 304. Detailed view 310 further depicts an RF channel 314 that has been milled into probe assembly housing 300. Notably, RF channel 314 is configured to guide electromagnetic waves from the waveguide transition 316 to the probe tip 312.

Figure 8:
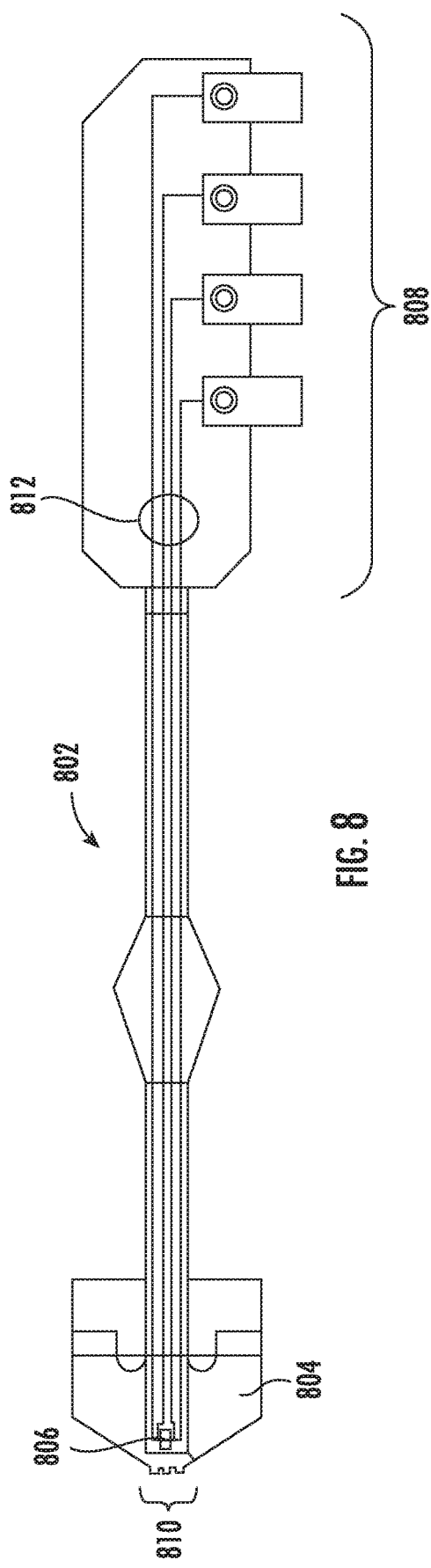
FIG. 8 is a schematic diagram illustrating the geometry and layout of a micromachined wafer probe tip with an integrated diode sensor that is coupled to four-point sensing contact pads according to an embodiment of the subject matter described herein.

In some embodiments, electrical contact between probe assembly housing 300 and probe chip 302 is established in order to accommodate a direct current (DC) bias feed to the probe chip. Notably, this is accomplished by utilizing beam-lead tabs that protrude from the perimeter of probe chip 302. In some embodiments, the beamlead tabs comprise four-point sensing contact pads as depicted in FIG. 8 and described below. Namely, the beamlead tabs of probe chip 302 can be tacked down to permanent DC contact pads that are integrated within probe assembly housing 300. In some embodiments, probe chip 302 protrudes approximately 500 micrometers (μm) from probe assembly housing 300, such that direct contact between probe tips 312 of probe chip 302 and the test pads of a DUT is permitted.

Figure 4:
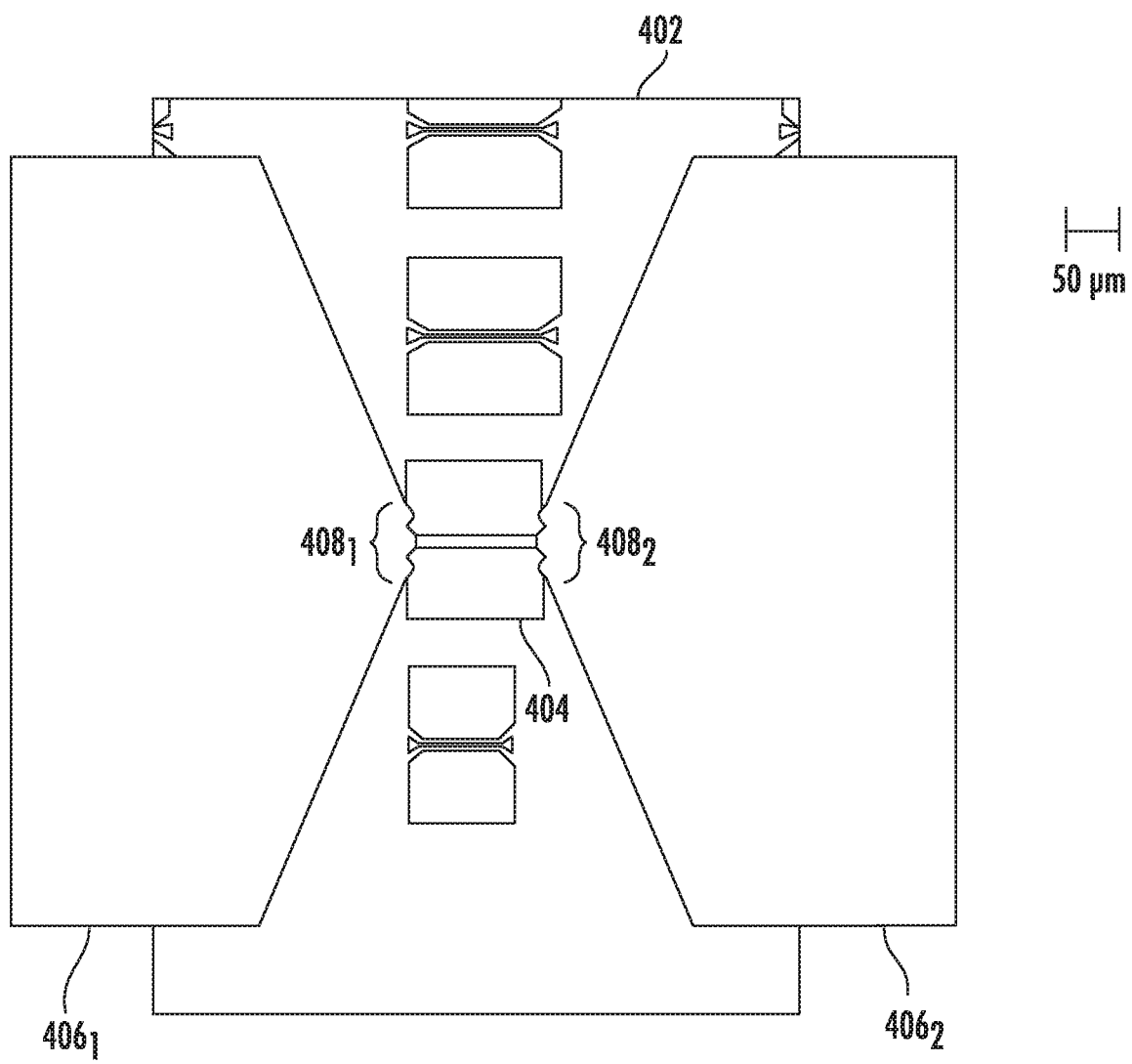
FIG. 4 is an illustration of exemplary micromachined probe tips contacting a coplanar transmission line of a device under test according to an embodiment of the subject matter described herein.

FIG. 4 is an illustration of exemplary micromachined probe tips contacting a coplanar transmission line of a device under test according to an embodiment of the subject matter described herein. In particular, FIG. 4 illustrates a microscope image of two probe tips $406_{1-2}$ establishing contact with an on-wafer DUT 402. In some embodiments, on-wafer DUT 402 comprises a coplanar transmission line that includes a plurality of metallic DUT conductor pads that can be interfaced by contact points $408_{1-2}$ of probe tips $406_{1-2}$. For example, FIG. 4 depicts the edges of a DUT conductor pad 404 that is directly contacted by contact points $408_{1-2}$.

B. Probe Characterization

In some embodiments, the micromachined probe chips can be characterized mechanically using a load cell test measurement. When a probe chip comes in contact with the test pads of a DUT, the silicon beam portion (e.g., beam head element 102 shown in FIG. 1) can deflect and generate a force that is proportional to the vertical distance that the probe device travels after the inserted probe chip makes contact with a DUT. In some examples, the probe chip can be modeled as a linear spring with a restoring force that is responsible for generating a low-resistance contact interface with the test pads of the DUT. In some examples, the typical contact resistance measured for nickel-plated probe tips contacting gold DUT contact pads is 35 milliohms (mΩ).

Further, the RF performance of the disclosed probe chips can be characterized using a two-tier calibration approach in which the scattering parameters of the probe chip are de-embedded from a set of measurements. Initially, a one-port calibration can be performed at the test port of a network analyzer to which the probe chip can be attached. Subsequently, a second calibration may be performed with the probe chip using on-wafer standards. In some examples, on-wafer standards can include coplanar transmission lines and terminations (as illustrated in FIG. 4). Using the measurements of the on-wafer standards, the scattering parameters of the probe chips can be determined using a least-squares fit.

The fabrication process employed to construct the micromachined probe chips as described above can simplify probe assembly and is fully-compatible with other established semiconductor processing methods. Consequently, the micromachined wafer probe chips are readily amenable to being integrated with semiconductor devices and detectors (e.g., including diode temperature sensors), thereby permitting the realization of compact instrumentation to be incorporated directly onto the probe chip.

III. HETEROGENEOUSLY-INTEGRATED DIODE SENSORS

In some embodiments, diodes based on III-V semiconductor material can be used as temperature sensors in commercial cryogenic measurement systems. Due to their relative insensitivity to applied magnetic fields at low temperatures, gallium-aluminum-arsenide (GaAlAs) diode sensors are often preferred over silicon sensor devices for thermometer applications operating in the 1.4 K to 500-K temperature range. Notably, the sensitivity of GaAlAs diodes sensors is typically a few millivolts/Kelvin (mV/K) at temperatures above 40 K. However, the sensitivity of these diode sensor devices rapidly increase to over 100 mV/K at temperatures below 40 K.

In some embodiments, the integration of diode temperature sensors directly onto a micromachined probe chip can require a process that involves the transfer and bonding of the III-V epitaxy to silicon. In some embodiments, diode sensors may be fabricated using an epitaxy transfer method that involves wafer-bonding GaAs material to silicon with an adhesive layer of bonding agent, such as a SU-8 photoresist solution or a metal bonding agent.

A. Epitaxy Transfer Process

In some embodiments, the process for fabricating a heterogeneously integrated diode element may utilize a 650 μm semi-insulating GaAs wafer with epitaxial layers including: i) a 1 μm AlGaAs etch stop layer, ii) a n-GaAs (280 nm, $2 \times 10^{17}$ cm$^{-3}$) device layer, iii) a n+-GaAs (1 μm, $5 \times 10^{18}$ cm$^{-3}$) device layer, and iv) a graded highly doped (>$10^{19}$ cm$^{-3}$) InGaAs cap layer. In some embodiments, the InGaAs cap is included to facilitate the formation of a low resistance ohmic contact and thermal heat sink using a Ti/Pd/Au/Ti metal stack-up that does not require thermal annealing.

Wafer bonding of the GaAs layer to a high-resistivity silicon substrate can be accomplished using a negative epoxy-based photoresist solution (e.g., SU-8) that is used to produce high-aspect ratio features. For example, the low curing temperature (e.g., 100-140° C.) of SU-8 coupled with its relatively low percent volume shrinkage after crosslinking results in a robust transfer. Notably, the epitaxy transfer is not subject to fracture or delamination due to mismatches in thermal expansion coefficients. After the bonding of the GaAs layer to the silicon substrate is completed, the semi-insulating GaAs layer is removed after the application of a nitric acid solution and a citric acid solution for slow etching. After this slow etch process is conducted, the AlGaAs etch stop layer is removed after being subjected to a hydrofluoric acid solution.

B. Diode Fabrication and Characterization

Figure 5:
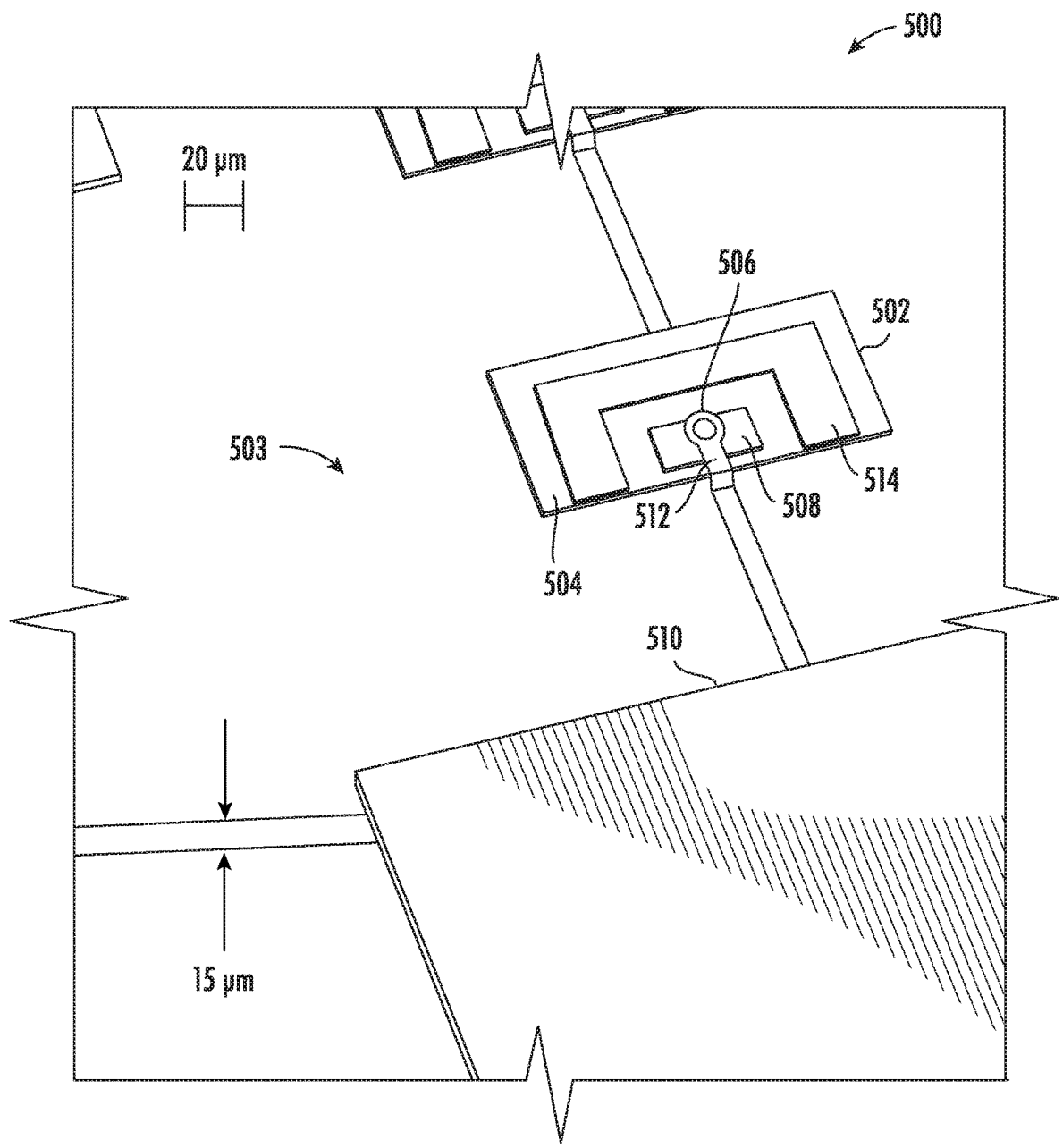
FIG. 5 is a schematic diagram illustrating an exemplary set of diode sensors that are integrated onto a silicon substrate according to an embodiment of the subject matter described herein.

FIG. 5 is a schematic diagram illustrating an exemplary set of diode sensors that are integrated onto a silicon substrate according to an embodiment of the subject matter described herein. In particular, FIG. 5 depicts an illustration of a completed diode sensor 502 that is integrated on a semiconductor substrate 503. In some embodiments, diode sensor 502 comprises a Schottky diode. In order to fabricate a diode sensor 502 (e.g., diode temperature sensor) depicted in FIG. 5, a diode mesa 508 (e.g., GaAs mesa) can be defined using photolithography on the GaAs/InGaAs-ohmic metal-silicon stack-up and formed by a sequence of selective etches that stop at a silicon surface (e.g., substrate 503). Afterwards, a second GaAs etch using a piranha etching solution comprising sulfuric acid and hydrogen peroxide (e.g., $H_2SO_4:H_2O_2$ solution) can be used to define the final diode mesa (e.g., mesa 508) atop a contact pedestal 504. In some embodiments, contact pedestal 504 comprises an ohmic metal contact pedestal. The remaining fabrication process steps include lithographic patterning to form the anode contact 506, an airbridge finger 512, a gold overlay 514, ohmic contact overlay metallization, and other circuit features on the silicon surface. Consequently, diode sensor 502 formed by this fabrication process has a "quasi-vertical" geometry in which contact pedestal 504 is bonded to high-resistivity silicon (e.g., substrate 503) and underlies the diode mesa 508 and anode contact 506.

Once fabrication of the diode is completed, a silicon carrier substrate can be micromachined to form a probe chip with integrated beamleads (e.g., beamlead 510) and geometry that are tailored to match the probe assembly housing that the probe chip will ultimately be affixed. The micromachining process may utilize a SOI substrate as the carrier wafer on which the diodes are bonded and is based on the 'backside processing method' previously described above in order to fabricate one or more wafer probe chips. Initially, the surface of the wafer including diode circuitry is bonded to a sacrificial or temporary carrier using a wafer-bond adhesive. Subsequently, the thick handle silicon and buried oxide are removed through a reactive ion etching process and the use of a BOE etching solution. In a final step, backside lithography can be used to define the probe chip geometry and a silicon etchant is utilized to form and finalize the probe chips. Individual probe chips are then released by removing the sacrificial carrier wafer. Notably, FIG. 5 depicts a detailed view 500 of an integrated circuit that incorporates a heterogeneously-integrated diode sensor 502 that was constructed using the abovementioned fabrication approach.

Figure 6:
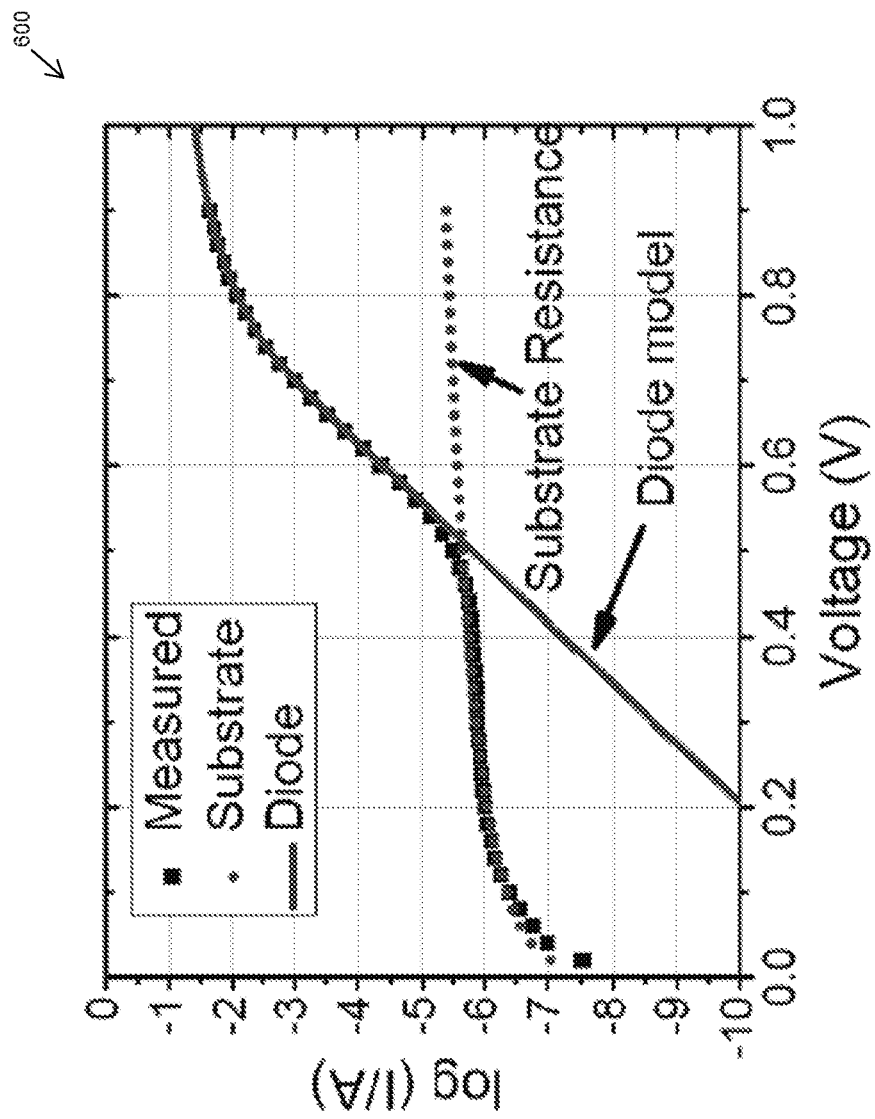
FIG. 6 is a graph illustrating the measured room temperature current-voltage characteristic of a diode sensor according to an embodiment of the subject matter described herein.

In some examples, the current-voltage characterization of a heterogeneously-integrated diode can be performed with a Keithley 236 Source Measure Unit. FIG. 6 depicts a graph 600 illustrating the measured room temperature current-voltage characteristic of an integrated diode sensor according to an embodiment of the subject matter described herein. In particular, graph 600 depicts a typical DC characteristic (e.g., in logarithmic scale) for a diode sensor with a 3 μm diameter anode. Moreover, the logarithmic current-voltage characteristic for the diode contact pads on the silicon substrate without the diode present (e.g., the substrate alone) is represented in graph 600 by a dotted line. This logarithmic current-voltage characteristic can be attributed to a shunt leakage current that traverses through the silicon substrate, which has a nominal resistivity of 10 kΩ·cm. Notably, fitting a linear current-voltage characteristic to this measurement yields a total substrate leakage resistance of ~230 kΩ. This substrate leakage resistance is largely insignificant compared to the impedance of a diode that is operating in forward bias. An estimation of the diode reverse saturation current, ideality factor, and series resistance can be determined by performing a least-squares fit to the I-V curve in forward bias, as shown in FIG. 6. The device parameters resulting from this least squares fitting, for the nominal 3 μm diameter diode, are represented below in Table I.

TABLE 1

EXTRACTED DIODE PARAMETERS

| Ideality Factor | Series Resistance | Saturation Current |
|---|---|---|
| 1.19 | 4.2 Ω | 0.1 pA |

IV. TEMPERATURE SENSOR PROBE DESIGN

Figure 7:
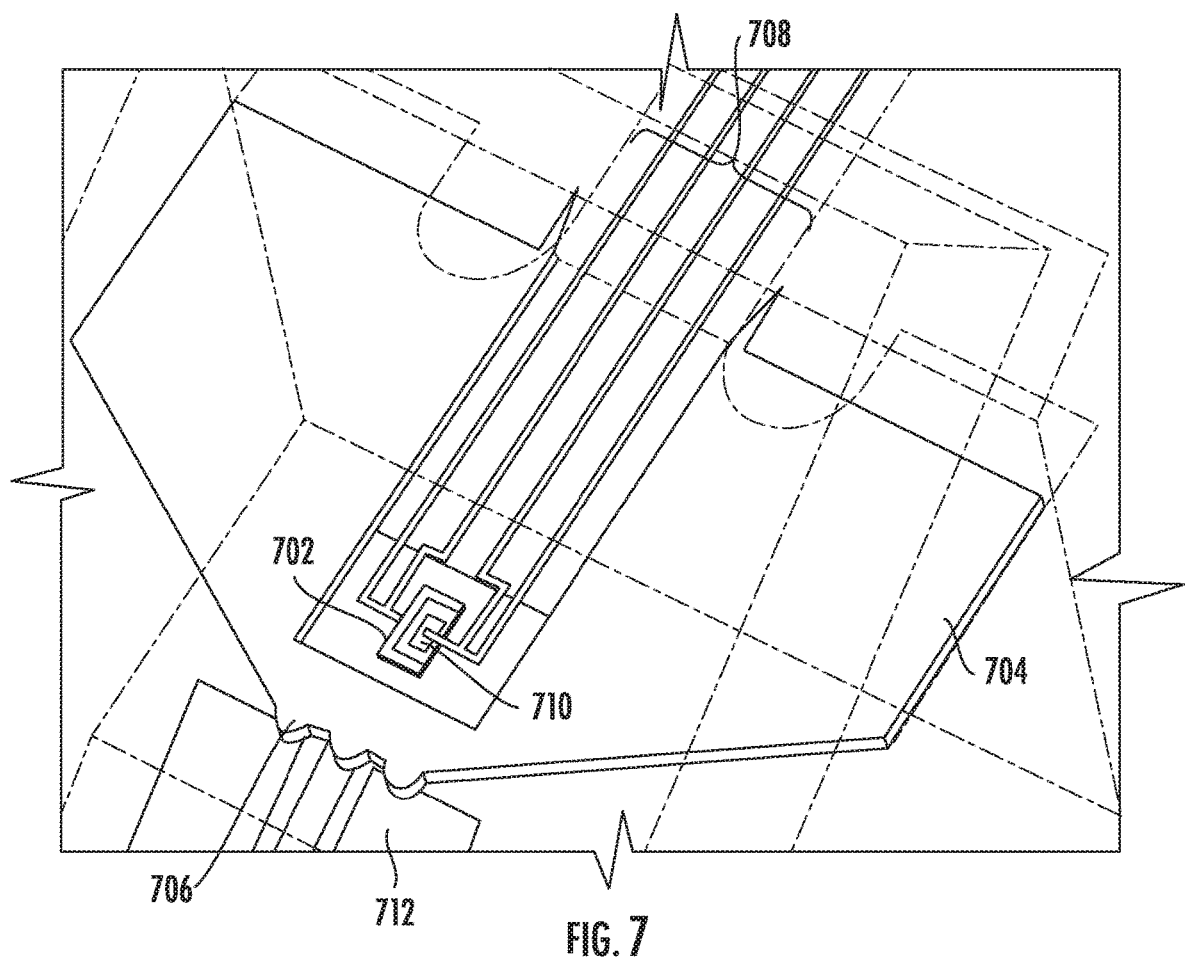
FIG. 7 is a schematic diagram illustrating the layout of a micromachined wafer probe tip that incorporates a diode sensor according to an embodiment of the subject matter described herein.

In some embodiments, a micromachined on-wafer probe chip with integrated diode temperature sensor that is based on the micromachining and heterogeneous integration processes as described above is presented in FIG. 7. FIG. 7 is a schematic diagram illustrating the layout of a micromachined wafer probe tip that incorporates a diode sensor according to an embodiment of the subject matter described herein. In particular, FIG. 7 shows a finite-element model of the region near the probe tip 706 and illustrates the location of a diode temperature sensor 702 and GaAs mesa 710 as well as the sensing circuitry used to measure the diode current voltage characteristic. Diode temperature sensor 702 can be placed near the probe tips 706 where the probe chip 704 interfaces with the DUT 712. The full layout of the probe chip 704, including four-wire sensing components 708 (e.g., signal lines) that lead to backend electrical contacts, and the alignment and/or mounting tabs for assembling and/or inserting probe chip 704 into its probe assembly housing, is shown in FIG. 8.

FIG. 8 is a schematic diagram illustrating the geometry and layout of a micromachined wafer probe tip with an integrated diode sensor that is coupled to four-point sensing contact pads according to an embodiment of the subject matter described herein. As depicted in FIG. 8, probe chip 802 comprises a single, integrated module that can be fabricated on thin micromachined high-resistivity semiconductor material, such as silicon. In some embodiments, the semiconductor material can be characterized as having a resistivity of greater than 10 kiloOhm centimeters (kΩ·cm). Probe chip 802 may further include incorporated probe tips 810 that are positioned at the terminal end of a beam head portion 804 and are configured for direct interfacing (e.g., establishing contact) with a DUT. Probe tips 810 may comprise any metallized or metallic material that is conducive for forming electrical contacts for probe chip 802. Probe chip 802 is further configured with an integrated filter for applying bias and beamlead tabs that can be used to align and mount probe chip 802 to a probe assembly housing. Notably, a diode sensor 806 is positioned on and/or integrated with beam head portion 804 of probe chip 802. Diode sensor 806 is also communicatively connected with four-point sensing contact pads 808 via four (4) signal lines 812 (also shown in FIG. 7 four-wire sensing components 708). In some embodiments, the signal lines 812 are used to carry the sensing voltage or sensing current supplied by a network analyzer device to the integrated diode sensor 806 and probe tips 810. Notably, four-point sensing contact pads 808 can be used by the network analyzer device as an access point to obtain the resulting sensing data that is collected by the probe tips 810 (after coming into contact with a DUT) in order to conduct any necessary measurements or assessments.

A. Finite-Element Simulation

Returning to FIG. 7, a finite element model of probe chip 704 can be simulated using a software application (e.g., Autodesk Inventor Mechanical software package) to estimate the stress that is induced in the probe chip 704 when each probe tip 706 is subjected to a 10 mN load. This load subjected on probe tips 706 corresponds to a typical contact force that is required for a low-resistance electrical interface.

Figure 9:
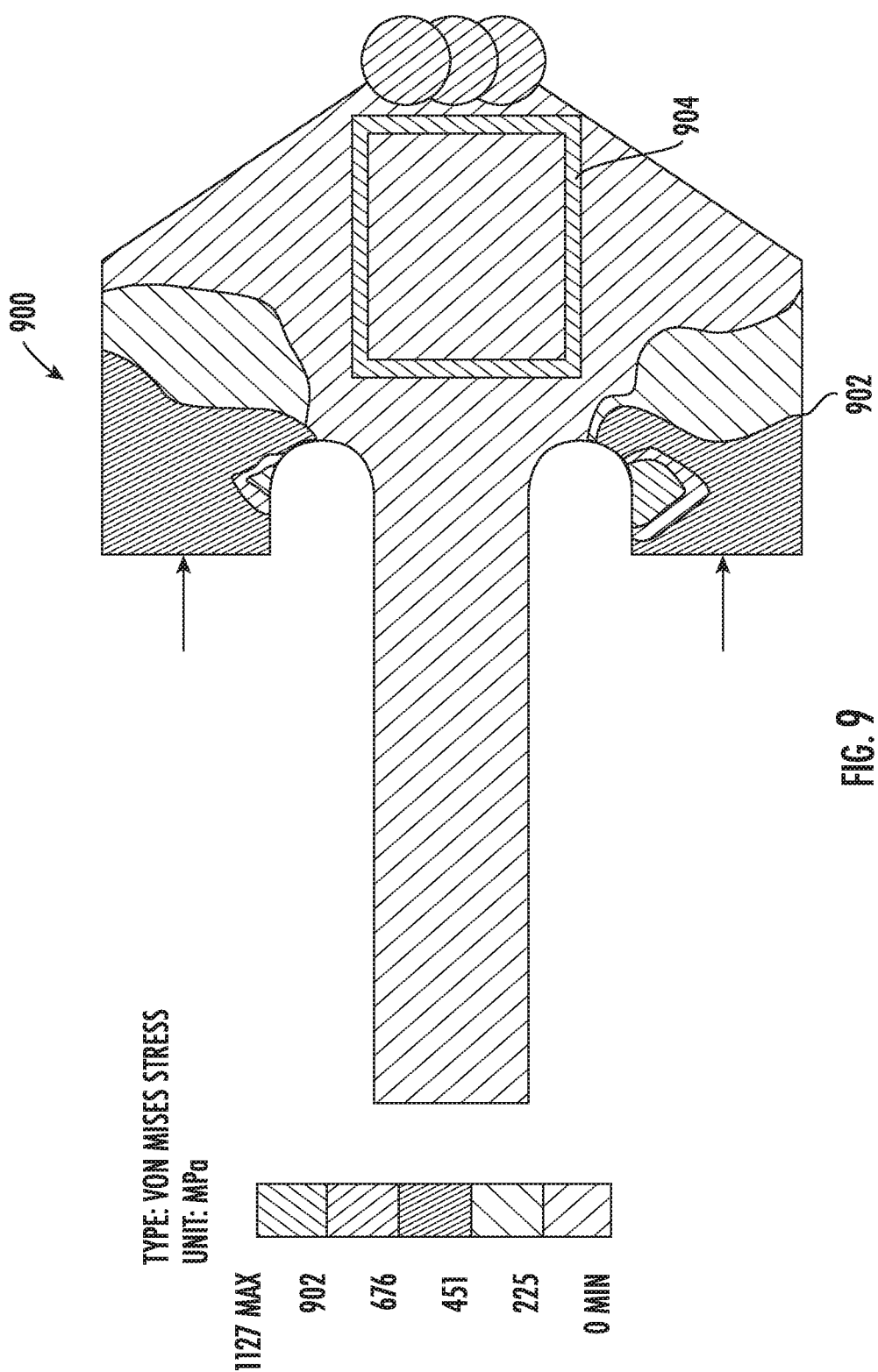
FIG. 9 is an illustration of a mechanical simulation of a temperature-sensor wafer probe according to an embodiment of the subject matter described herein.

The display result of this finite element simulation is shown in FIG. 9. In particular, FIG. 9 is an illustration of a mechanical simulation of a temperature-sensor wafer probe chip 900 according to an embodiment of the subject matter described herein. In order to minimize the impact of induced strain on the electrical characteristics and mechanical integrity of the diode, an integrated diode temperature sensor is placed near the probe tip in a region 904 of low induced stress. The largest stress in the silicon (e.g., 1.1 GPa as shown in FIG. 9) occurs in the region 902 where the probe chip is clamped to the probe assembly housing. Rounded fillets in these regions are included in the probe chip design to ensure the stress remains well below the yield strength of silicon (e.g., 4.5 GPa).

B. Low-Temperature Diode Characterization

In some embodiments, prototype quasi-vertical diodes fabricated for a temperature sensor probe were characterized at low temperatures using a cryogenic probe station (e.g., Lakeshore TTP-6 cryogenic probe station). Sample diodes can be mounted to the cryostat cold stage using Apiezon N Grease, held in place with a clip, and the cryostat can be cooled with liquid nitrogen to 77 K. In some tests, the contact pads of the diodes can be connected to feedthroughs using DC probes and the diode current-voltage characteristics measured as a function of the temperature of the cold stage. Calibrated silicon thermometers secured directly onto the substrate by a thermally anchored clip can be used to measure the diode temperature. Once temperature is achieved, the stage can be slowly brought back to room temperate through the use of a heater.

V. ADDITIONAL EMBODIMENTS

As indicated above, the integrated diode sensor can be configured to provide other functions other than the aforementioned temperature sensing. For example, the integrated diode sensor can be used as an RF measurement detector. Specifically, a diode sensor can be embodied as a 6-port reflectometer that is heterogeneously integrated on a micromachined on-wafer probe chip. In some embodiments, the standing wave due to the reflection of the DUT on the wafer is sampled by four detectors positioned along the primary transmission line of the probe chip. Such an integrated probe chip can be designed to account for low insertion loss and high reflection loss, which may be required to maintain the probe chip's RF performance for S-parameters measurement. In order for the sampled line reflectometer to work properly, the sampling detector circuits need to present a low loading effect (close to RF open) to the transmission line to be sampled on the DUT. Further, there is a trade-off between high coupling to provide sufficient power to the detector diodes and low coupling in order to achieve a low loading effect that can sustain the original standing wave on the transmission line to be sampled. The power distribution among the integrated diode sensors should also be sufficiently uniform in order to maximize the dynamic range since the calibration of a six port reflectometer relies on the mathematical manipulation of power ratios between each of the diode sensors.

In some embodiments, the anode size needs to be small enough so that the junction resistance dominates the junction capacitance, such that the diode sensor functions as a varistor. For example, 1.2 micrometer and 1.8 micrometer anode sizes can be used as options. Two common types of power detector schemes can be utilized depending on how a diode sensor is biased. The current-biased type is preferred for an integrated 6-port reflectometer on micromachined on-wafer probe chips since it is easier to realize on the probe chip structure. Alternatively, an in-situ RF ground detector diode embodiment can also be implemented for a voltage-biased type.

In some embodiments, the exciting radio frequency source is fed in from the waveguide port, which is coupled to the planar circuit on the probe chip and continues down to the on-wafer DUT through the probe tip contact pads. DC output ports on the beam head can serve as both DC output and DC biasing of the diode sensors together with a DC bias port. The fabrication process of the integrated six-port reflectometer on-wafer probe chip is the same as the exemplary temperature sensor probe described above.

In some embodiments, the diode sensors can be used for other functionalities other than detection (e.g., temperature detection and radio frequency detection). For example, the diode sensors can be configured to perform other functions such as a mixing functionality, a multiplying functionality, and/or a tuning functionality.

The embodiments disclosed herein are provided only by way of example and are not to be used in any way to limit the scope of the subject matter disclosed herein. As such, it will be understood that various details of the presently disclosed subject matter may be changed without departing from the scope of the presently disclosed subject matter. The foregoing description is for the purpose of illustration only, and not for the purpose of limitation.

VI. CONCLUSION

The subject matter described herein discloses the design and fabrication process for implementing an integrated on-wafer temperature sensor that, for the first time, combines a silicon micromachined probe with a heterogeneously-integrated III-V diode thermometer. The diode sensors fabricated in this manner show comparable performance to commercial GaAlAs thermometers in the 77-280 K temperature range. In some embodiments, these quasi-vertical diodes can be integrated onto a micromachined wafer probe chip and characterizing the performance of the temperature sensors to liquid helium temperatures (4.2 K).

REFERENCES

All references listed in the instant disclosure, including but not limited to all patents, patent applications and publications thereof, scientific journal articles, and database entries are incorporated herein by reference in their entireties to the extent that the references supplement, explain, provide a background for, or teach methodology, techniques, and/or embodiments employed herein. Specifically, the devices, systems, apparatuses, compositions, materials, machine readable medium, computer program products, and methods of various embodiments of the subject matter disclosed herein may utilize aspects disclosed in the following references, applications, publications and patents and which are hereby incorporated by reference herein in their entirety, and which are not admitted to be prior art with respect to the present invention by inclusion in this section:

[1] L. A. Samoska, "An overview of solid-state integrated circuit amplifiers in the submillimeter-wave and THz regime," *IEEE Transactions on Terahertz Science and Technology*, vol. 1, no. 1, pp. 9-24, September 2011.

[2] J. Laskar, J. J. Bautista, M. Nishimoto, M. Hamai, and R. Lai, "Development of accurate on-wafer, cryogenic characterization techniques," *IEEE Transactions on Microwave Theory and Techniques*, vol. 44, no. 7, pp. 1178-1183 Jul. 1996.

[3] S. Svechnikov, G. Gol'tsman, B. Voronov, P. Yagoubov, S. Cherednichenko, E. Gershenzon, V. Belitsky, H. Ekstrom, E. Kollberg, A. Semenov, Y. Gousev, and K. Renk, "Spiral antenna NbN hot-electron bolometer mixer at submm frequencies," *IEEE Transactions on Applied Superconductivity*, vol. 7, no. 2, pp. 3395-3398 Jun. 1997.

[4] H. Ogawa, A. Mizuno, H. Hoko, H. Ishikawa, and Y. Fukui, "A 110 GHZ SIS receiver for radio astronomy,"

[5] A. Caddemi and N. Donato, "Characterization techniques for temperature-dependent experimental analysis of microwave transistors," *IEEE Transactions on Instrumentation and Measurement*, vol. 52, no. 1, pp. 85-91, February 2003.

[6] A. Caddemi, G. Crupi, and N. Donato, "Microwave characterization and modeling of packaged HEMTs by a direct extraction procedure down to 30 K," *IEEE Transactions on Instrumentation and Measurement*, vol. 55, no. 2, pp. 465-470, April 2006.

[7] D. R. Daughton, D. McLean, S. Yano, A. Macor, E. de Rijk, A. von Bieren, M. Favre, M. Bauwens, A. Lichtenberger, N. S. Barker, R. M. Weikle, II, J. L. Hesler, C. Rowland, and E. Bryerton, "WR-5.1 band, on-wafer characterization at cryogenic temperatures," in *European Microwave Conference (EuMC)*, September 2015, pp. 319-322.

[8] T. J. Reck, L. Chen, C. Zhang, C. Groppi, H. Xu, A. Arsenovic, N. S. Barker, A. Lichtenberger, and R. M. Weikle, II, "Micromachined on-wafer probes," in *IEEE MTT-S International Microwave Symposium*, May 2010, pp. 65-68.

[9] D. R. Daughton, M. F. Bauwens, J. Bluestein, M. E. Cyberey, E. de Rijk, M. Favre, A. W. Lichtenberger, N. S. Barker, R. M. Weikle, II, J. Hesler, C. Rowland, E. Bryerton, D. McLean, and S. Yano, "Cryogenic temperature, 2-port, on-wafer characterization at WR-5.1 frequencies," in *IEEE MTT-S International Microwave Symposium*, May 2016, pp. 1-4.

[10] N. S. Barker, M. Bauwens, A. Lichtenberger, and R. M. Weikle, II, "Silicon-on-insulator substrates as a micromachining platform for advanced terahertz circuits," (invited), *Proceedings of the IEEE*, vol. 105, no. 6, pp. 1105-1120 Jun. 2017.

[11] T. J. Reck, L. Chen, C. Zhang, A. Arsenovic, C. Groppi, A. Lichtenberger, R. M. Weikle II, and N. S. Barker, "Micromachined probes for submillimeter-wave on-wafer measurements part II: RF design and characterization," *IEEE Transactions on Terahertz Science and Technology*, vol. 1, no. 2, pp. 357-363, November 2011.

[12] M. F. Bauwens, N. Alijabbari, A. W. Lichtenberger, N. S. Barker, and R. M. Weikle, "A 1.1 THz micromachined on-wafer probe," in *IEEE MTT-S International Microwave Symposium*, June 2014, pp. 1-4.

[13] T. G. Bifano, J. Perreault, R. K. Mali, and M. N. Horenstein, "Microelectromechanical deformable mirrors," *IEEE Journal of Selected Topics in Quantum Electronics*, vol. 5, no. 1, pp. 83-89, January 1999.

[14] R. B. Bass, A. Lichtenberger, R. M. Weikle, II, S. Pan, E. Bryerton, and C. K. Walker, "Ultra-thin silicon chips for submillimeter-wave applications," in *International Symposium on Space THz Technology*, 2004, pp. 392-399.

[15] C. J. Yeager and S. S. Courts, "A review of cryogenic thermometry and common temperature sensors," *IEEE Sensors Journal*, vol. 1, no. 4, pp. 352-360, December 2001.

[16] S. B. Ota and S. Ota, "A study of forward characteristics of a GaAlAs temperature sensor diode," *Measurement Science and Technology*, vol. 11, no. 6, p. 815, 2000.

[17] Lakeshore Cryotronics, Inc., "Temperature Sensor Selection Guide." [Online]. Available: https://www.lakeshore.com

[18] N. Alijabbari, M. F. Bauwens, and R. M. Weikle, II, "Design and characterization of integrated submillimeter-wave quasi-vertical Schottky diodes," *IEEE Transaction on Terahertz Science and Technology*, vol. 5, no. 1, pp. 73-80, January 2015.

[19] R. M. Weikle II, H. Li, A. Arsenovic, S. Nadri, L. Xie, M. F. Bauwens, N. Alijabbari, N. S. Barker, and A. W. Lichtenberger, "Micromachined interfaces for metrology and packaging applications in the submillimeter-wave band," *Additional Conferences (Device Packaging, HiTEC, HiTEN, & CICMT)*, vol. 2017, no. DPC, pp. 1-36, 2017.

[20] L. Xie, S. Nadri, N. Alijabbari, M. E. Cyberey, M. F. Bauwens, A. W. Lichtenberger, N. S. Barker, and R. M. Weikle II, "An epitaxy transfer process for heterogeneous integration of submillimeter-wave GaAs Schottky diodes on silicon using SU-8," *IEEE Electron Device Letters*, vol. 38, no. 11, pp. 1516-1519 Nov. 2017.

[21] S. Nadri, L. Xie, N. Alijabbari, J. T. Gaskins, B. M. Foley, P. E. Hopkins, and R. M. Weikle, II, "Steady-state thermal analysis of an integrated 160 GHz balanced quadrupler based on quasi-vertical Schottky diodes," in *IRMMW-THz*, August 2015, pp. 1-2.

[22] N. Alijabbari, M. F. Bauwens, and R. M. Weikle, II, "160 GHz balanced frequency quadruplers based on quasi-vertical Schottky varactors integrated on micromachined silicon," *IEEE Transactions on Terahertz Science and Technology*, vol. 4, no. 6, pp. 678-685, November 2014.

[23] T. J. Reck, L. Chen, C. Zhang, A. Arsenovic, C. Groppi, A. W. Lichtenberger, R. M. Weikle II, and N. S. Barker, "Micromachined probes for submillimeter-wave on-wafer measurements part I: mechanical design and characterization," *IEEE Transactions on Terahertz Science and Technology*, vol. 1, no. 2, pp. 349-356, November 2011.

[24] Z. Zhang, "The effect of cryogenic environment on sensitivity of piezoelectric pressure transducers," in *IEEE Instrumentation and Measurement Technology Conference*, May 2009, pp. 177-180.

[25] Lakeshore Cryotronics, Inc., "GaAlAs Diodes Catalog." [Online]. Available: https://www.lakeshore.com

[26] F. A. Padovani and R. Stratton, "Field and thermionic-field emission in Schottky barriers," *Solid-State Electronics*, vol. 9, no. 7, pp. 695-707, 1966.

[27] P. M. Gammon, A. Perez-Tomas, V. A. Shah, O. Vavasour, E. Donchev, J. S. Pang, M. Myronov, C. A. Fisher, M. R. Jennings, D. R. Leadley, and P. A. Mawby, "Modelling the inhomogeneous SiC Schottky interface," *Journal of Applied Physics*, vol. 114, no. 22, p. 223704, 2013.

What is claimed is:

1. A probe chip device comprising:
   a beam head element that includes at least one probe tip that is configured to electrically probe a device under test, the at least one probe tip being integrated with the beam head element and configured to deflect when physically contacting a device under test (DUT) and generate a restoring force sufficient for providing a low-resistance electrical interface with the DUT;
   a silicon substrate, wherein the beam head element including the at least one probe tip is located on the silicon substrate; and
   a diode sensor located at a first end of the probe chip device in a recess formed in the beam head element, the diode sensor including a gallium arsenide (GaAs) layer that is wafer bonded to the silicon substrate and is proximally positioned to the at least one probe tip;
   a plurality of sensing contact pads located at a second end of the probe chip device spaced from the first end;

a plurality of signal lines located in the recess and extending between the first and second ends of the probe chip device for electrically connecting the diode sensor to the sensing contact pads for carrying a sensing voltage or a sensing current from a network analyzer to the diode sensor and the at least one probe tip;

wherein the diode sensor comprises an ohmic contact bonded to the silicon substrate, the ohmic contact underlying a diode mesa and an anode contact; and wherein the diode sensor is a temperature sensing element.

2. The probe chip device of claim 1 wherein the diode sensor is integrated onto the beam head element using a bonding agent, and wherein the bonding agent comprises SU-8 photoresist solution.

3. The probe chip device of claim 1 wherein the diode sensor is a Schottky diode sensor.

4. The probe chip device of claim 1 wherein the sensing voltage or the sensing current is applied to the at least one probe tip via the diode sensor.

5. The probe chip device of claim 1 wherein the at least one probe tip is configured to establish contact with an integrated circuit device under test.

6. The probe chip device of claim 1 wherein the diode sensor is configured to conduct at least one of a reflectometry functionality, a mixer functionality, a multiplying functionality, or tuning functionality.

* * * * *